(12) United States Patent
Tucker et al.

(10) Patent No.: US 9,995,253 B2
(45) Date of Patent: Jun. 12, 2018

(54) AIR DUCT SYSTEM

(71) Applicant: GM GLOBAL TECHNOLOGY OPERATIONS LLC, Detroit, MI (US)

(72) Inventors: Eric R. Tucker, Waterford, MI (US); Steven A. Kornburger, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 15/221,055

(22) Filed: Jul. 27, 2016

(65) Prior Publication Data
US 2018/0030938 A1 Feb. 1, 2018

(51) Int. Cl.
| | | |
|---|---|---|
| F02M 35/10 | (2006.01) | |
| F02M 35/02 | (2006.01) | |
| F02M 35/024 | (2006.01) | |
| F16L 23/08 | (2006.01) | |
| F16L 23/12 | (2006.01) | |
| F16L 25/00 | (2006.01) | |

(52) U.S. Cl.
CPC .. *F02M 35/10144* (2013.01); *F02M 35/0204* (2013.01); *F02M 35/024* (2013.01); *F16L 23/08* (2013.01); *F16L 23/12* (2013.01)

(58) Field of Classification Search
CPC ...................................................... F16L 37/26
USPC .................................. 285/67, 325, 326, 103
See application file for complete search history.

(56) References Cited

U.S. PATENT DOCUMENTS

| | | | | |
|---|---|---|---|---|
| 295,151 A | * | 3/1884 | Cummins | F16L 25/08 285/325 |
| 348,556 A | * | 9/1886 | Grueninger | F16L 37/26 285/405 |
| 545,066 A | * | 8/1895 | Fregeau | F16L 37/252 285/148.13 |
| 653,143 A | * | 7/1900 | Martin | F16L 37/26 285/305 |
| 686,571 A | * | 11/1901 | Wilson | F16L 37/26 285/67 |
| 1,179,207 A | * | 4/1916 | Miller | F16L 27/12 285/31 |
| 1,739,131 A | * | 12/1929 | Van Ness Eick | F16L 37/252 285/67 |
| 2,663,315 A | * | 12/1953 | Rush | F16L 37/26 137/572 |
| 3,260,539 A | * | 7/1966 | Herron | F16L 37/26 285/24 |

(Continued)

*Primary Examiner* — Aaron M Dunwoody
(74) *Attorney, Agent, or Firm* — Quinn IP Law

(57) ABSTRACT

An air duct system includes a first member that includes a groove disposed around only a portion of an opening. A second member defines a passage extending along a longitudinal axis, and is in fluid communication with the opening of the first member. The second member includes a flange disposed within the groove of the first member. The engagement between the flange and the groove restricts relative movement between the first member and the second member in an axial direction along the longitudinal axis. An attachment system connects the first member and the second member together, and restricts relative movement between the first member and the second member in a lateral direction that is transverse to the longitudinal axis, to secure the flange within the groove.

16 Claims, 3 Drawing Sheets

(56) References Cited

U.S. PATENT DOCUMENTS

| | | | | |
|---|---|---|---|---|
| 3,605,337 A * | 9/1971 | Rodgers | F16J 13/02 | 220/316 |
| 3,953,057 A * | 4/1976 | Petzetakis | F16L 41/021 | 285/133.21 |
| 4,422,472 A * | 12/1983 | Klein | F16L 37/26 | 137/614.06 |
| 4,767,136 A * | 8/1988 | Lehmann | F16L 25/12 | 285/32 |
| 4,767,137 A * | 8/1988 | Zinner | F16L 23/14 | 285/325 |
| 6,062,609 A * | 5/2000 | Chauvire | F16L 37/26 | 285/311 |
| 7,390,031 B2 * | 6/2008 | Kraft | F16L 23/02 | 285/113 |
| 7,488,007 B2 * | 2/2009 | Weber | F04D 29/607 | 285/325 |
| 7,552,949 B2 * | 6/2009 | Riordan, III | F16L 21/065 | 285/103 |
| 8,079,620 B1 * | 12/2011 | Weber | F04D 29/606 | 285/325 |

\* cited by examiner

AIR DUCT SYSTEM

TECHNICAL FIELD

The disclosure generally relates to an air duct system for a vehicle.

BACKGROUND

Vehicles using internal combustion engines typically include an air duct system for collecting and directing a flow of air to the engine for combustion. The air duct system may include an intake pipe that collects the air, and directs the flow of air to an un-filtered air chamber of an air cleaner box. The air cleaner box includes a filter element that filters particulate matter from the flow of air. The air flows from the un-filtered air chamber, through the filter element, to a filtered air chamber. An outlet is connected to the filtered air chamber, and directs the flow of air to the engine for combustion.

Often, at least one component of the air duct system is attached to a structural member of the vehicle, and another component of the air duct system is attached to the engine. For example, the intake pipe may be attached to the structural member, and the air cleaner box may be attached to the engine. The air duct system may include a flexible connecting member in order to isolate vibration and/or movement between the component of the air duct system attached to the engine, and the component of the air duct system attached to the structural member of the vehicle. The flexible connecting member may include, for example, a plurality of convolutes or bellows that allow movement in three dimensions. Typically, the connecting member includes a cylindrical portion that slides over a tubular portion of another component, and is secured by an annular screw driven band clamp or other similar device. However, packaging constraints and assembly procedures in some vehicles may require that the connecting member be axially compressed in order to fit between the two components being connected, and then axially expanded to slide over the respective tubular portions of the components that the connecting member is interconnecting

SUMMARY

An air duct system is provided. The air duct system includes a first member and a second member. The first member defines an opening, and includes a groove disposed around a portion of the opening. The second member has a first end, and defines a passage extending along a longitudinal axis, through the first end. The passage is in fluid communication with the opening of the first member. The second member includes a flange disposed within the groove of the first member. The engagement between the flange and the groove is operable to restrict relative movement between the first member and the second member in an axial direction along the longitudinal axis. An attachment system connects the first member and the second member together. The attachment system is operable to restrict relative movement between the first member and the second member in a lateral direction that is generally transverse to the longitudinal axis, to secure the flange within the groove.

An air duct system for a vehicle is also provided. The air duct system includes an air cleaner box that defines an opening, and includes a groove disposed around only a portion of the opening. A connecting member includes a main body portion having a first end and a second end. The main body portion defines a passage extending along a longitudinal axis between the first end and the second end. The passage is in fluid communication with the opening of the air cleaner box. The connecting member includes a flange disposed at the first end of the connecting member. The flange is disposed within the groove of the air cleaner box. The engagement between the flange and the groove is operable to restrict relative movement between the air cleaner box and the connecting member in an axial direction along the longitudinal axis. An attachment system connects the air cleaner box and the connecting member together. The attachment system is operable to restrict relative movement between the air cleaner box and the connecting member in a lateral direction that is generally transverse to the longitudinal axis, to secure the flange within the groove. An inlet duct member is attached to the second end of the connecting member. The connecting member includes a plurality of convolutes that are operable to allow relative movement between the air cleaner box and the inlet duct member.

Accordingly, the flange of the connecting member slides into the groove of the first member, e.g., the air cleaner box, from a transverse or lateral direction relative to the longitudinal axis of the connecting member. As such, the connecting member does not have to be axially compressed along its longitudinal axis for installation, thereby making the connection between the connecting member and the first member, e.g., the air cleaner box, easier when in a confined space.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, an air duct system is generally shown at 20. The air duct system 20 may be used in any system, but is particularly useful when integrated into a vehicle for conducting ambient air to an internal combustion engine for combustion. The vehicle may include, but is not limited to, any mobile platform, such as an automobile, a truck, a tractor, a boat, a train, an ATV, etc. However, it should be appreciated that use of the air duct system 20 is not limited to a vehicle. The air duct system 20 may be incorporated into other assemblies, such as, but not limited to, a stationary engine, generator, etc.

Figure 1:
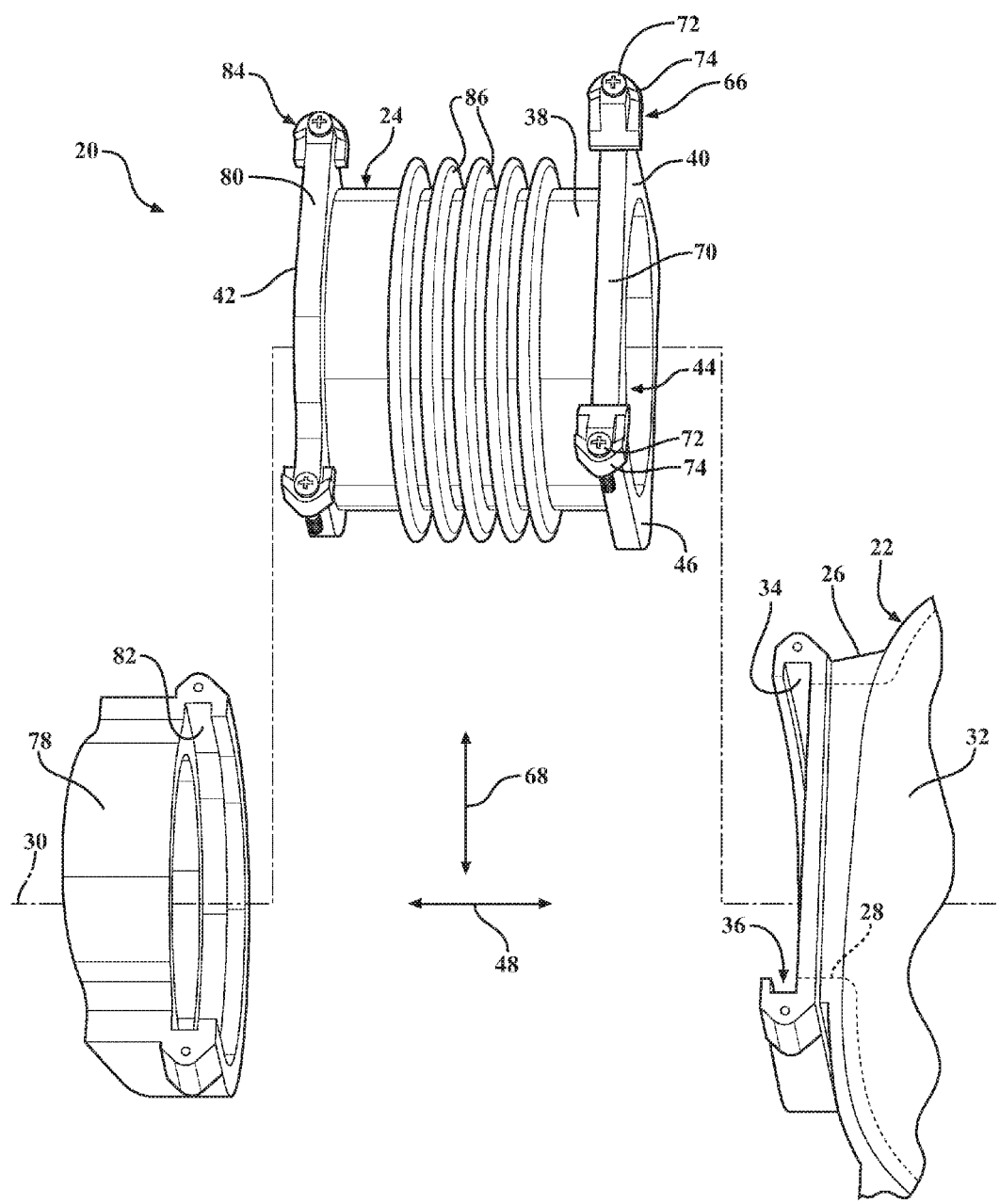
FIG. 1 is a schematic, exploded perspective view of an air duct system.
Figure 2:
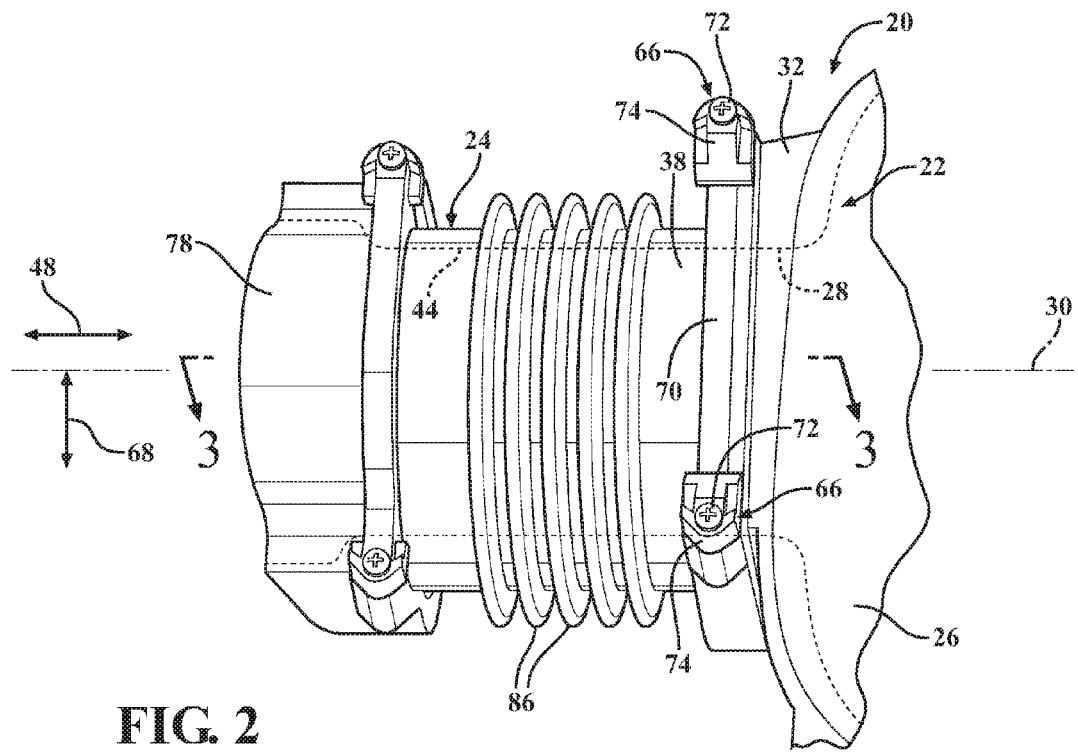
FIG. 2 is a schematic perspective view of the air duct system.

Referring to FIGS. 1 and 2, the air duct system 20 includes at least a first member 22 and a second member 24. When incorporated into a vehicle, the first member 22 may be defined as, for example, an air cleaner box, and the second member 24 may be defined as, for example, a connecting member. The description of the first member 22 and the second member 24 in a vehicular application is provided merely as an exemplary embodiment. As such, the air duct system 20 is not limited to use in the vehicle.

The first member 22 includes a housing 26 that defines an opening 28. The opening 28 is generally concentric with a longitudinal axis 30. As shown in the Figures, the longitudinal axis 30 is linear. However, in other embodiments, the longitudinal axis 30 may be non-linear, and may alternatively be described as a longitudinal path. The housing 26 includes a wall 32 that may be formed into any suitable shape. The opening 28 provides fluid communication through the wall 32 of the housing 26. As shown in the Figures, the exemplary embodiment of the first member 22 includes a generally circular opening 28. However, it should be appreciated that the opening 28 may include a non-circular shape if desired. The longitudinal axis 30 extends generally perpendicular to the opening 28, and is generally centered in the opening 28.

Referring to FIG. 1, the first member 22 includes a groove 34 disposed around only a portion of the opening 28. The groove 34 does not completely extend around the entirety of the opening 28. The groove 34 includes an open face 36 that faces inward, and is open toward the longitudinal axis 30. The groove 34 partially encircles the opening 28. The groove 34 may generally be described as extending around three sides of the opening 28, i.e., a right side, a left side, and a bottom side. The groove 34 does not extend over a top side of the opening 28. It should be appreciated that the terms "right", "left", "top", and "bottom" are used merely as general descriptors. Furthermore, it should be appreciated that terms "right", "left", "top", and "bottom" are only generally used to describe a relative position of the opening 28, and may not be distinguishable from each other, such as the case in the circular opening 28 shown in the Figures. The groove 34 may alternatively be described as extending less than 360° around the longitudinal axis 30, thereby leaving a portion of the opening 28 not surrounded by the groove 34.

Referring to FIG. 1, the second member 24 includes a main body 38 portion having a first end 40 and a second end 42. The second end 42 is disposed opposite the first end 40 along the longitudinal axis 30. The main body 38 portion of the second member 24 defines a passage 44 extending along the longitudinal axis 30, between the first end 40 and the second end 42. The passage 44 is in fluid communication with the opening 28 of the first member 22. As shown in the Figures, the exemplary embodiment of the second member 24 includes a generally circular passage 44. However, it should be appreciated that the passage 44 may include a non-circular shape if desired. The passage 44 is generally aligned and concentric with the longitudinal axis 30.

Figure 3:
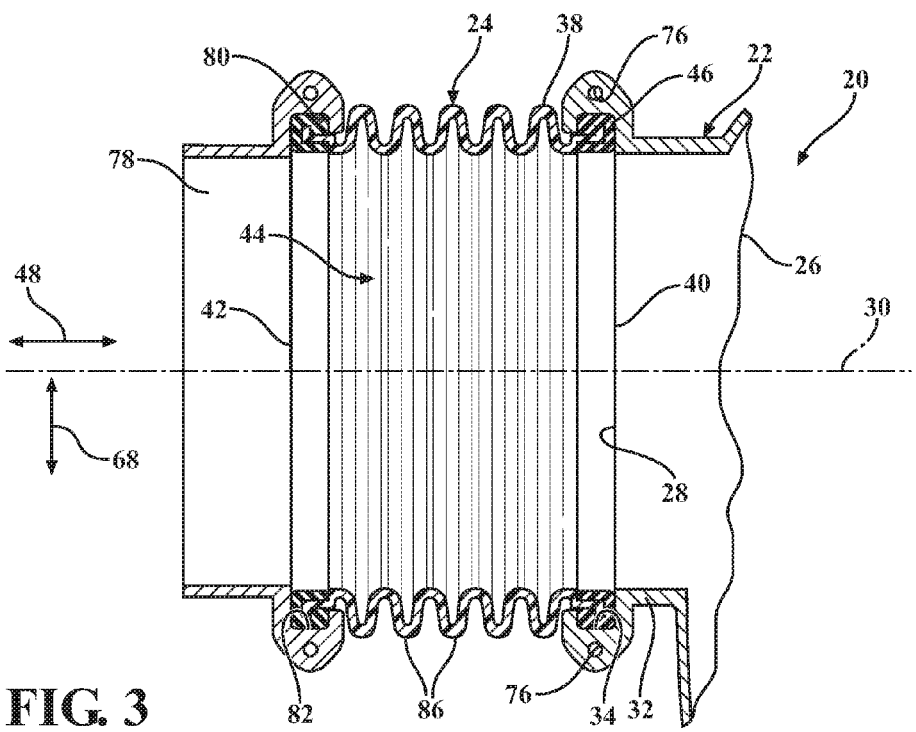
FIG. 3 is a schematic cross sectional view of the air duct system.

Referring to FIGS. 1 through 3, the second member 24 includes a flange 46. The flange 46 is disposed at the first end 40 of the second member 24, and is seated within the groove 34 of the first member 22. The flange 46 does not completely extend around the entirety of the main body 38 portion of the second member 24. As best shown in FIG. 1, the flange 46 extends outward from the main body 38 portion, in an outward radial direction relative to the longitudinal axis 30. The flange 46 partially encircles the passage 44. The flange 46 may generally be described as extending around three sides of the main body 38 portion of the second member 24, i.e., a right side, a left side, and a bottom side. The flange 46 does not extend over a top side of the main body 38 portion. It should be appreciated that the terms "right", "left", "bottom", and "top" are used merely as general descriptors. Furthermore, it should be appreciated that terms "right", "left", "top", and "bottom" are only generally used to describe a relative position of the passage 44, and may not be distinguishable from each other, such as the case in the circular passage 44 shown in the Figures. The flange 46 may alternatively be described as extending less than 360° around the longitudinal axis 30, thereby leaving a portion of the main body 38 portion of the second member 24 not surrounded by the flange 46.

Referring to FIG. 3, the engagement between the flange 46 and the groove 34 is operable to restrict relative movement between the first member 22 and the second member 24 in an axial direction 48 along the longitudinal axis 30. The flange 46 of the second member 24 is positioned within the groove 34 of the first member 22 by moving the second member 24 in a direction transverse to the longitudinal axis 30, generally shown in FIG. 1, so that the flange 46 enters and slides within the groove 34 of the first member 22. The second member 24 is moved transverse to the longitudinal axis 30 until the passage 44 in the second member 24 is generally aligned with the opening 28 in the first member 22, generally shown in FIG. 2. Referring to FIGS. 2 and 3, once the flange 46 is seated within the groove 34, the second member 24 is restrained from moving axially along the longitudinal axis 30 relative to the first member 22.

Figure 4:
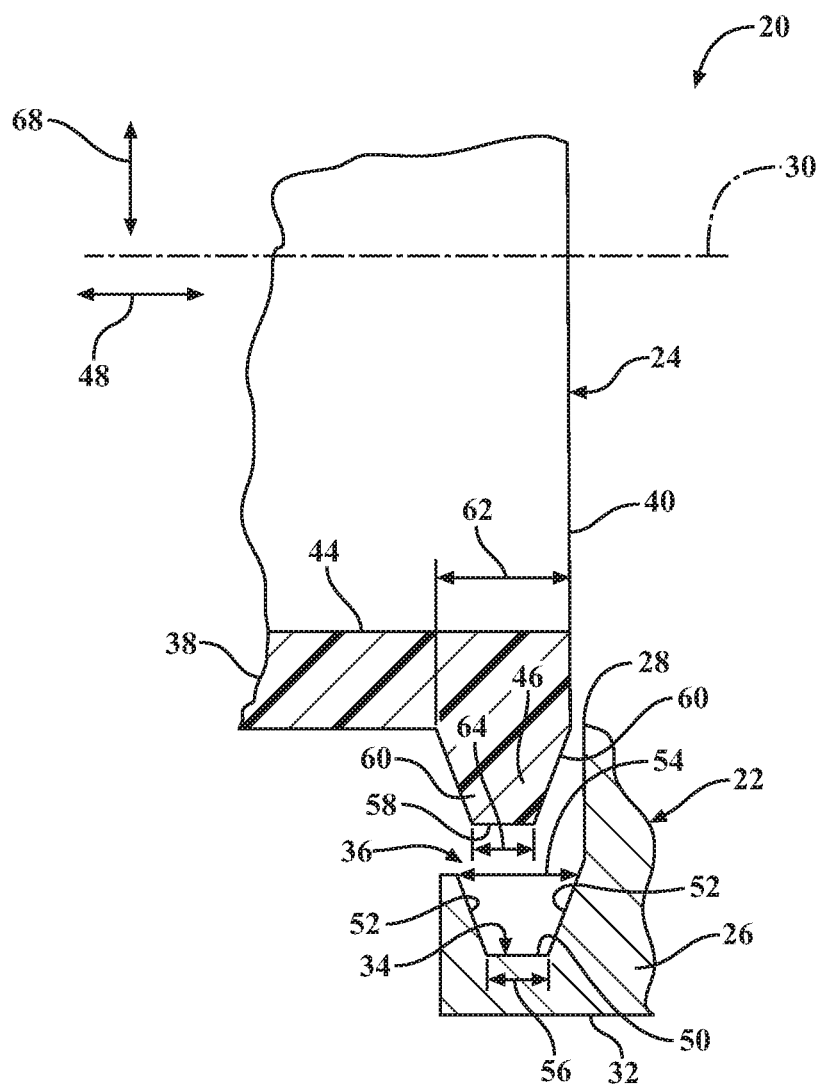
FIG. 4 is a schematic, fragmentary exploded cross sectional view of the air duct system.

Referring to FIG. 4, the flange 46 and/or the groove 34 may each, or individually, include a cross section substantially parallel to the longitudinal axis 30 that defines a tapered cross sectional shape. The tapered cross sectional shape may facilitate insertion of the flange 46 within the groove 34. If both the flange 46 and the groove 34 or formed to include a tapered cross sectional shape, then they are complimentarily shaped for mating engagement therebetween.

As noted above, the groove 34 includes an open face 36 disposed substantially parallel with the longitudinal axis 30. The groove 34 further includes a bottom wall 50 disposed substantially parallel with the longitudinal axis 30 and spaced farther from the longitudinal axis 30 than the open face 36. The groove 34 includes a pair of opposing sidewalls 52 that are spaced from each other along the longitudinal axis 30, and extend from the bottom wall 50, substantially transverse to the longitudinal axis 30, toward the open face 36. The open face 36 includes a width 54 measured substantially parallel to the longitudinal axis 30. The bottom wall 50 includes a length 56 between the sidewalls 52 and measured substantially parallel to the longitudinal axis 30. If the groove 34 includes a tapered cross section, then the width 54 of the open face 36 is greater than the length 56 of the bottom wall 50 such that a cross section of the groove 34 along the longitudinal axis 30 defines a tapered groove 34 that opens up toward the longitudinal axis 30.

Referring to FIG. 4, the flange 46 includes an outer surface 58 that is disposed substantially parallel with the longitudinal axis 30, and partially surrounds the passage 44. A pair of opposing side walls 60 extend outward from the main body 38 portion of the second member 24, to the outer surface 58 of the flange 46. The flange 46 includes a base width 62 measured substantially parallel to the longitudinal axis 30, between the opposing side walls 60 of the flange 46 and adjacent the main body 38 portion of the second member 24. The outer surface 58 of the flange 46 includes a length 64 between the side walls 60 of the flange 46 that is measured substantially parallel to the longitudinal axis 30. If the flange 46 includes a tapered cross sectional shape, then the base width 62 of the flange 46 is greater than the length 64 of the outer surface 58 of the flange 46, such that a cross section of the flange 46 along the longitudinal axis 30 defines a tapered flange 46 that narrows with an increase in distance from the longitudinal axis 30.

Referring to FIG. 2, the air duct system 20 includes an attachment system 66 that connects the first member 22 and the second member 24 together. The attachment system 66 is operable to restrict relative movement between the first member 22 and the second member 24 in at least a lateral direction 68, which is generally transverse to the longitudinal axis 30, to secure the flange 46 within the groove 34. The attachment system 66 may further restrict relative movement between the first member 22 and the second member 24 in the axial direction 48, along the longitudinal axis 30. However, due to the interaction between the flange 46 and the groove 34, the primary purpose of the attachment system 66 is to restrain the second member 24 against lateral movement relative to the longitudinal axis 30, to prevent the flange 46 from dislodging from within the groove 34.

As best shown in FIG. 1, and as noted above, the flange 46 does not extend around the entirety of the main body 38 portion of the second member 24. The second member 24 includes an upper surface 70, across which the flange 46 does not extend. The flange 46 extends from the upper surface 70, around the longitudinal axis 30, and back to the upper surface 70, such that the upper surface 70 and the flange 46 cooperate to surround the passage 44. Preferably, and as shown in the exemplary embodiment in FIG. 2, the attachment system 66 engages the second member 24 adjacent the upper surface 70 of the second member 24. However, it should be appreciated that the attachment system 66 could be configured to engage the second member 24 at some other location.

The attachment system 66 may include any device or combination of devices or components that are capable of restraining the second member 24 against lateral movement relative to the longitudinal axis 30 to secure the flange 46 within the groove 34. For example, the exemplary embodiment of the attachment system 66 shown in the Figures and described herein includes a fastener 72 engaging the first member 22. More preferably, the fastener 72 may be disposed in threaded engagement with the first member 22. Additionally, the exemplary embodiment of the attachment system 66 includes a pair of tabs 74 generally disposed on the upper surface 70 of the second member 24, and extending outward from the main body 38 portion of the second member 24 and away from the longitudinal axis 30. Each of the tabs 74 include an aperture 76, with a respective fastener 72 extending through the aperture 76 of the tab 74 and into threaded engagement with the first member 22. It should be appreciated that the attachment system 66 described herein is merely exemplary, and that the attachment system 66 may include other devices, such as but not limited to, spring clips, snap connections, push-pins, etc.

Referring to FIGS. 1 and 2, the air duct system 20 may further include a third member 78. The third member 78 may include, for example, an intake tube for an air induction system. The third member 78 is attached to the second end 42 of the second member 24. The third member 78 may be attached to the second member 24 in any suitable manner. For example, and as shown in the exemplary embodiment, the second end 42 of the second member 24 is equipped with a second flange 80, similar to the flange 46 shown at the first end 40 of the second member 24. The third member 78 is equipped with a second groove 82, similar to the groove 34 in the first member 22. The second flange 80 is seated within the second groove 82, and a second attachment system 84 secures the second member 24 to the third member 78 against movement in the lateral direction 68 relative to the longitudinal axis 30.

Referring to FIGS. 1 and 2, the second member 24 may be configured as a semi-flexible structure that is operable to allow relative movement between the first member 22 and the third member 78. For example, the second member 24 may include one or more convolutes 86 or bellows devices that allow axial expansion and/or contraction along the longitudinal axis 30, and permit an amount of lateral movement between the first member 22 and the third member 78 in the lateral direction 68 relative to the longitudinal axis 30.

The first member 22 and the third member 78 may be manufactured from any suitable material that is sufficiently rigid to maintain their respective shapes. For example, the first member 22 and the third member 78 may be manufactured from a plastic, polymer, metal, or other similarly rigid material. The second member 24 may be manufactured from a rigid material if it is not intended to allow relative movement between the first member 22 and the third member 78. However, if the second member 24 is intended to allow relative movement between the first member 22 and the third member 78, then the second member 24 may be manufactured from a flexible material, or combination of materials that allow the second member 24 to flex and bend, such as a rubber material, a plastic material, or a plastic material overlaid with a rubber material, etc.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An air duct system for a vehicle, the air duct system comprising:
   an air cleaner box defining an opening and including a groove disposed around only a portion of the opening;
   a connecting member including a main body portion having a first end and a second end, and defining a passage extending along a longitudinal axis between the first end and the second end, and in fluid communication with the opening of the air cleaner box;
   wherein the connecting member includes a flange disposed at the first end of the connecting member, within the groove of the air cleaner box;
   wherein engagement between the flange and the groove restricts relative movement between the air cleaner box and the connecting member in an axial direction along the longitudinal axis;
   an attachment system connecting the air cleaner box and the connecting member together, wherein the attachment system is operable to restrict relative movement between the air cleaner box and the connecting member in a lateral direction that is generally transverse to the longitudinal axis, to secure the flange within the groove;
   an inlet duct member attached to the second end of the connecting member; and wherein the connecting member includes a plurality of convolutes that are operable to allow relative movement between the air cleaner box and the inlet duct member.

2. The air duct system set forth in claim 1, wherein the groove includes an open face disposed substantially parallel with the longitudinal axis, and a bottom wall disposed substantially parallel with the longitudinal axis and spaced farther from the longitudinal axis than the open face.

3. The air duct system set forth in claim 2, wherein the groove includes a pair of opposing sidewalls spaced from each other and extending from the bottom wall, substantially transverse to the longitudinal axis, toward the open face.

4. The air duct system set forth in claim 3, wherein the open face includes a width measured substantially parallel to the longitudinal axis, and the bottom wall includes a length between the sidewalls and measured substantially parallel to the longitudinal axis, wherein the width of the open face is greater than the length of the bottom wall such that a cross section of the groove along the longitudinal axis defines a tapered groove that opens up toward the longitudinal axis.

5. The air duct system set forth in claim 1, wherein the connecting member includes a main body portion, and the flange includes an outer surface disposed substantially parallel with the longitudinal axis and partially surrounding the passage, and a pair of opposing side walls extending outward from the main body portion of the connecting member to the outer surface of the flange.

6. The air duct system set forth in claim 5, wherein the flange includes a base width measured substantially parallel to the longitudinal axis between the opposing side walls of the flange and adjacent the main body portion of the connecting member, and the outer surface of the flange includes a length between the side walls of the flange that is measured substantially parallel to the longitudinal axis, with the base width of the flange greater than the length of the end surface of the flange, such that a cross section of the flange along the longitudinal axis defines a tapered flange that narrows with an increase in distance from the longitudinal axis.

7. The air duct system set forth in claim 1, wherein each of the flange and the groove includes a tapered cross section substantially parallel to the longitudinal axis for mating engagement therebetween.

8. The air duct system set forth in claim 1, wherein the connecting member is a semi-flexible structure operable to allow relative movement between the air cleaner box and the inlet duct member.

9. The air duct system set forth in claim 1, wherein the groove extends around only the portion of the opening, and does not completely extend around the opening.

10. The air duct system set forth in claim 1, wherein the connecting member includes an upper surface, and the flange extends from the upper surface around the longitudinal axis, and back to the upper surface, such that the upper surface and the flange cooperate to surround the passage.

11. The air duct system set forth in claim 10, wherein the attachment system engages the connecting member adjacent the upper surface of the connecting member.

12. The air duct system set forth in claim 1, wherein at least one of the flange and the groove includes a tapered cross section substantially parallel to the longitudinal axis.

13. The air duct system set forth in claim 1, wherein the attachment system includes a fastener in threaded engagement with the air cleaner box.

14. The air duct system set forth in claim 13, wherein the attachment system includes a tab extending outward from the connecting member and away from the longitudinal axis.

15. The air duct system set forth in claim 14 wherein the tab includes an aperture, with the fastener extending through the aperture of the tab.

16. The air duct system set forth in claim 1, wherein:
the inlet duct member includes a second groove;
the connecting member includes a second flange disposed at the second end of the connecting member, with the second flange seated within the second groove; and
a second attachment system connecting the inlet duct member and the connecting member together.

* * * * *